United States Patent [19]

Webb

[11] 4,005,423
[45] Jan. 25, 1977

[54] SYNTHETIC APERTURE RADAR UTILIZING A LOW-SPEED ANALOG-TO-DIGITAL CONVERTER

[75] Inventor: William R. Webb, Catonsville, Md.

[73] Assignee: The United States of America as represented by the Secretary of the Navy, Washington, D.C.

[22] Filed: July 9, 1975

[21] Appl. No.: 594,415

[52] U.S. Cl. .................... 343/17.2 PC; 179/15 A; 179/15.55 R; 328/58; 340/347 AD; 343/7 A
[51] Int. Cl.² ................................................ G01S 7/28
[58] Field of Search ................ 343/5 DP, 7 A, 7.7, 343/14, 17.2 PC, 17.1 R, 17.1 PF; 307/221 D; 328/58, 30; 340/347 AD; 179/15 A, 15.55 R, 15.55 T

[56] References Cited
UNITED STATES PATENTS

| | | |
|---|---|---|
| 3,706,989 | 12/1972 | Taylor, Jr. .......................... 343/7.7 |
| 3,742,500 | 6/1973 | Freedman ........................... 343/7.7 |
| 3,774,201 | 11/1973 | Collins ......................... 343/17.2 PC |
| 3,787,852 | 1/1974 | Puckette et al. .............. 307/221 D |
| 3,877,010 | 4/1975 | Holberg et al. ..................... 343/7.7 |
| 3,877,011 | 4/1975 | Holberg et al. ..................... 343/7.7 |
| 3,930,255 | 12/1975 | Means ........................... 307/221 D |

Primary Examiner—Malcolm F. Hubler
Assistant Examiner—S. C. Buczinski
Attorney, Agent, or Firm—R. S. Sciascia; L. I. Shrago

[57] ABSTRACT

A radar receiver employing digital signal processing utilizes high-speed input buffers in the form of charge coupled devices that lower the data rate to the analog-to-digital converters so as to reduce their response requirements and, thereby, their cost while still permitting the system to achieve a high degree of range resolution.

4 Claims, 1 Drawing Figure

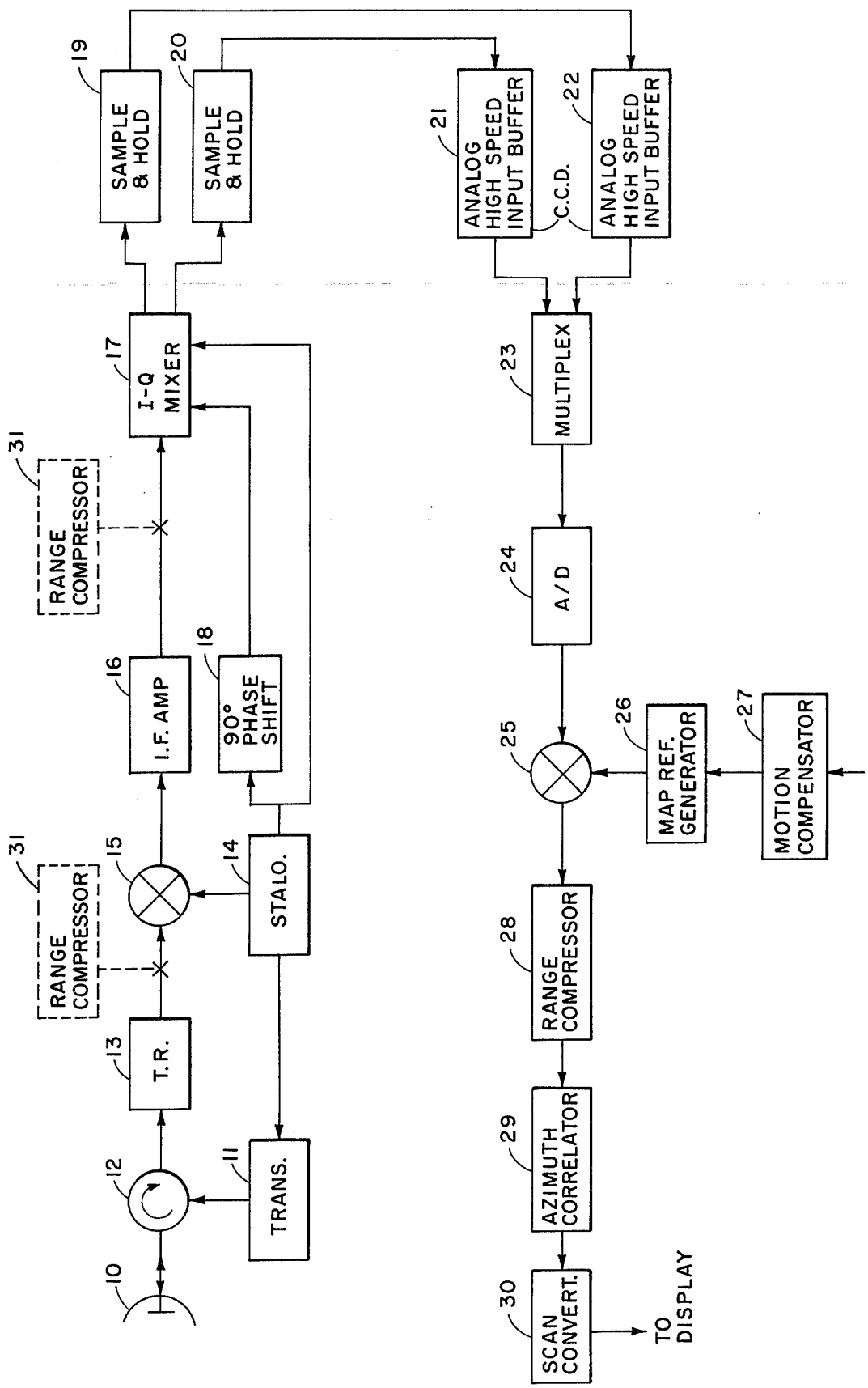

SYNTHETIC APERTURE RADAR UTILIZING A LOW-SPEED ANALOG-TO-DIGITAL CONVERTER

The present invention relates generally to radar receivers and, more particularly, to a low-cost digital signal processor for use in these receivers.

The increased utilization of digital signal processing in radar systems reflects recent technological advances in the fabrication of digital circuits and the greater flexibility these circuits afford in the processing of radar returns. However, digital signal processors are expensive because of their complexity and their need for one or more high-speed analog-to-digital converters. For example, in order to obtain range resolution under 10 ft., conversion rates in excess of 100MHz are required. Moreover, this conversion becomes all the more difficult and costly if more than a minimum dynamic range is necessary. This latter consideration has prevented the inclusion of inexpensive range compressors, such as surface wave devices, ahead of the analog-to-digital converter since this signal treatment may increase the dynamic range requirement of the analog-to-digital converter by 20DB or more.

It is, accordingly, a primary object of the present invention to provide a radar receiver which utilizes digital signal processes but does not require expensive analog-to-digital converters with high-speed conversion rates.

Another object of the present invention is to provide a digital signal processor for a synthetic aperture radar which can operate with relatively low-cost analog-to-digital converters whose conversion speeds are substantially less than those normally required in this type of processor.

Another object of the present invention is to provide a digital signal processor for a radar receiver which permits the use of comparatively low-speed analog-to-digital converters whereby range compression can be performed at either the IF or the RF frequencies.

Another object of the present invention is to provide a digital signal processor for a radar receiver wherein a charge coupled device performs as a high-speed analog shift register to substantially reduce the signal rate ahead of the analog-to-digital converter.

Briefly, and in general terms, the above objects of invention are realized by taking advantage of the extremely high operating speeds attainable with charged coupled devices. For example, shift registers utilizing this technology have been operated at data rates in excess of 135MHz. The dynamic range of these devices may be as high as 60 to 80DB.

In accordance with the present invention, a charge coupled shift register is introduced into the radar receiver at a suitable location ahead of the analog-to-digital conversion operation. This register functions as a high-speed input buffer so that the signal rate is reduced by a significant amount which may be as much as 200 to 1. Consequently, the analog-to-digital conversion is done at an appreciably lower speed. Hence, a significant cost reduction is realized even though each of the digital signals is increased by three or more bits.

Because of this lower conversion speed, analog range compression may be performed at either the IF or RF frequencies. With such a signal processing arrangement, the cost of the overall system is reduced since the need for performing the compression in a digital manner is avoided.

Referring now to the drawing, the signal figure of which generally illustrates a synthetic aperture radar system embodying the present invention, it will be seen that the over-all apparatus includes as convention components thereof an antenna 10 which is periodically excited at a given PRF by a transmitter 11 coupled thereto through a suitable circulator 12. As is standard practice, the echo pulses subsequently detected in the receiving portion of the cycle are coupled via circulator 12 and a receiver protecting device 13 to the input of a first mixer 15 which has as its other input a reference signal obtained from a stabilized local oscillator 14. Oscillator 14 also controls transmitter 11 so as to establish a coherent relationship between each radiated signal and the reference serving as the second input to mixer 15.

The IF signal present at the output of mixer 15 after amplification in IF amplifier 16 is fed to a mixer 17 which has as its other two reference inputs a pair of quadrature signals derived from local oscillator 14. More particularly, the output of this oscillator, $\sin\omega_m t$, is subjected to a 90° phase shift in circuit 18 to produce the signal $\cos\omega_m t$. The frequency of oscillator 14 is selected to coincide with the center frequency of the IF band.

Mixer 17, thus, reduces the center of the echo signal spectrum down to DC because of the IF frequency of oscillator 14. However, in order to preserve the phase and amplitude characteristics of the input signal for subsequent coherent signal processing, this reduction is accomplished with the sine and cosine signals. The resultant two video signal components, commonly referred to as the in-phase I and quadrature Q components of the signal at baseband, are fed to sample and hold circuits 19 and 20. The trains of stretched sample pulses produced by this operation are supplied to analog high-speed input buffers 21 and 22.

Each of the analog high-speed input buffers is a peristaltic or a buried channel charge coupled device. The reason for selecting this type of shift register has been mentioned hereinbefore; however, it would again be pointed out that these devices have data rates in excess of 135MHz, and their potential dynamic range has been reported to be as great as 60 to 80DB. For further information on these circuits, reference may be had to the article entitled, "The Peristaltic Charge Coupled Device" by L. J. M. Esser which appeared on pp. 269–277 of the Proceedings of the CCD Applications Conference held at the Naval Electronics Laboratory Center, San Diego, California on Aug. 20, 1973. Additionally, see also the article entitled, "The Peristaltic Charge-Coupled Device for High-Speed Change Transfer" by the same author which appeared as Paper No. WAM 2.3 in the Digest of Technical Papers of the 1974 IEEE International Solid-State Circuit Conference.

The use of the analog high-speed input buffers at this site permits the use of a less expensive analog-to-digital converter further on in the system. Alternatively, it allows the use of an analog-to-digital converter which has a greater dynamic range than is possible with current state-of-the-art circuits. Consider, for example, the fact that during the period in which data is being written into the high-speed input buffer, the echo signal must be complex sampled in real time at a rate compatible with the range resolution desired. For a range resolution of 5 ft., the sampling period must be somewhat less than 10 nanoseconds. In conventional digital radar receivers, the analog-to-digital converter is located immediately behind the I-Q mixer and, consequently, it has to operate at approximately a 100MHz rate to provide resolution of the kind just described.

The dynamic range for these converters is about 30DB, the same value as the radio frequency and IF sections and the I-Q mixer. After the analog-to-digital converter, the receiving system would normally have a digital high-speed input buffer followed by a digital range compressor and a digital azimuth compressor. The former circuits would have the same 30DB dynamic range while the last-mentioned compressor would require a 54DB range.

In the system shown, the analog high-speed input buffer is inserted in the analog portion of the receiver in order to slow down the data rate prior to the analog-to-digital conversion. This slow down can be carried out in a synthetic aperture radar system whenever, for example, the range extent of the ground area of interest is short compared to the range represented by the time between successive search pulses. For example, a one mile swath may be of interest where the pulse repetition frequency is 1,000 pulses per second. In such a case, data is connected for only 12.5 microseconds out of the total 1,000 microseconds time interval. Since this data is written into the high-speed input buffer only during this 12.5 microsecond interval and subsequently read out during the remaining 987.5 microsecond interval, the data rate is slowed down by a factor of 1/79.6. In comparison with the specific example mentioned hereinbefore where the analog-to-digital converter had to operate at a 100MHz rate in the system disclosed because of the relocation of the high-speed input buffer, the rate for buffers 21 and 22 need only have to be 100MHz/79.6 or 1.26MHz. Moreover, with a multiplexer 23 used to funnel the outputs of both buffers into a single analog-to-digital converter 24, the conversion rate of this single unit increases merely to 2.252MHz.

The digital signals from converter 24 in multiplex form are fed to a mixer 25 which has as its other input signals derived from a map reference generator 26 that are modified by circuit 27 to provide suitable signal compensation for any motion of the radar set, such as would be the case with airborne equipment.

The output from mixer 25 is applied to a digital range compressor 28. This compressor may be a correlator which has as its stored reference signal an appropriate FM waveform with the correct slope for removing the frequency modulation caused by the chirping of the transmitted signal. This correlator may consist of a multiplier and an integrator or a filter bank.

It would be pointed out that this compression may also be accomplished by an appropriate surface wave device having metalized interdigital patterns formed on a quartz substrate and capable of operating at frequencies in excess of 100MHz. In such a device, the center frequency of the uncompressed signal bandwidth is determined by the shape and spacing, that is, the geometry of the interdigital pattern.

After the digital compression in circuit 28, the resulting signal is supplied to an azimuth correlator 29 which functions to remove any modulation present as a consequence of the scanning motion of the directional beam from antenna 10 over the target area. This correlation process, which improves the azimuth resolution of the radar beyond that of the real beam, involves the use of a correlator reference signal that varies in the same manner as the target doppler so that a constant frequency difference is maintained over the correlation interval. In other words, the correlator reference frequency is varied as required to keep the signal within the correlator bandwidth during the correlation interval.

The output of the azimuth correlator 29 is fed to a scan converter 30 which modifies the signal format so as to make the data rate suitable for presentation on a cathode ray tube display device in a rectilinear or polar coordinate scanning pattern.

In the illustrative system shown, the I and Q components of the signal are correlated independently, and in this processing, both components are weighted equally. At the output of the processor, both components are combined and subjected to a detection process which is the equivalent of a square-root of the sum of squares processes and yields the absolute value of the vector represented by these components.

Also, in the arrangement shown, sample and hold circuits 19 and 20 are included between the I-Q mixer 17 and the analog high-speed input buffers 21 and 22. However, with proper clocking of the registers, the aperture time of these circuits may be made sufficiently small to eliminate the need for the external sample and hold function.

As an alternative arrangement, the receiver can be modified so as to have the range compression performed in the IF or RF portion of the system between, for example, the IF amplifier 16 and the I-Q mixer 17 as shown by circuit 31. This would eliminate, of course, the necessity of accomplishing this compression with digital signals as is the case with circuit 28 in the modification shown. Such a change is possible because of the additional dynamic range available at the analog-to-digital converter as a result of employing the charge coupled technology with an analog input signal. It would be mentioned that analog range compressors are cheaper to construct than digital range compressors, and this factor further contributes to the lower cost of the overall digital signal processor.

What is claimed is:
1. In a radar receiver of the type wherein the IF signals are mixed with a pair of quadraturely phased signals derived from a stabilized local oscillator whose frequency corresponds to the IF frequency so as to produce in-phase and quadraturely phased video signal components, the combination of
   a pair of sample and hold circuits;
   means for coupling each of said video signal components to a different one of said sample and hold circuits;
   an analog high-speed input buffer connected to each of said sample and hold circuits,
   each of said buffers being a charge coupled device which is adapted to store pulses applied to its input from said sample and hold circuit at one data rate during a first portion of each receiving cycle and to deliver said pulses to its output at a lower data rate during a second larger portion of each remaining cycle;
   means for multiplexing the pulses appearing in the outputs of said buffers; and
   means for converting said multiplexed pulses to corresponding digital signals for further processing.
2. In a radar receiver of the type wherein a stabilized local oscillator provides one input to a mixer which develops in its output circuit the IF signal, the subcombination of an IF amplifier connected to the output of said mixer;
a range compressor having its input connected to the output of said IF amplifier,
    said range compressor operating to transform a chirp type pulse of a predetermined length into a shorter pulse;
a mixing circuit;
means for coupling the output of said range compressor to one input of said mixing circuit;
means for coupling a pair of quadraturely phased signals whose frequencies correspond to that of said stabilized local oscillator to other inputs of said mixing circuit, whereby an in-phase and quadraturely phased video signal component is produced at two different outputs of said mixer circuit;
means for storing each video signal component in a charge coupled device at a predetermined data rate during a first fractional portion of each receiving cycle of said radar receiver and for delivering said signals to an output location at a slower data rate during a second longer fractional portion of each receiving cycle; and
means for converting the signals delivered to said output location to digital form for further processing in said radar receiver.

3. In a radar system of the type where detected echo signals are converted into video signal samples that are stored during part of the time interval between the transmission of successive search pulses by said radar system and thereafter converted into corresponding digital signals by an analog-to-digital converter for subsequent processing in the radar system, the improvement of
    utilizing as the storage means for the video signal samples a high-speed input buffer in the form of a charge-coupled register that accepts these samples at a comparatively high data rate during a first portion of the above time interval and transfers these samples to the analog-to-digital converter at a lower data rate during the remaining portion of this time interval, whereby the analog-to-digital converter can operate at a comparatively low speed while the radar system can still achieve a high degree of range resolution.

4. A front-end portion of a radar receiver for processing echo pulses, comprising the combination of
    a range compressor for shortening pulses;
    means for coupling echo pulses to the input of said range compressor;
    a mixer having a pair of inputs;
    means for feeding the output of said range compressor to one input of said mixer;
    a stabilized local oscillator;
    means for coupling the output signal from said oscillator to the other input of said mixer whereby an IF signal is produced in the output of said mixer;
    an IF amplifier connected to the output of said mixer;
    a second mixer;
    means for connecting the output of said IF amplifier to one input of said second mixer and for coupling a pair of quadraturely phased signals whose frequency corresponds to that of said stabilized local oscillator to a pair of other inputs of said mixer, whereby in-phase and quadraturely phased video components are produced in a pair of outputs of said second mixer;
    a sample and hold circuit coupled to each output of said second mixer;
    an analog high-speed input buffer connected to the output of each sample and hold circuit,
        each of said analog high-speed buffers being a charge coupled device which operates to register input pulses at a comparatively high data rate during a first portion of each receiving cycle and to deliver these pulses to its output at a slower data rate during the remaining portion of each receiving cycle; and
    means for converting the pulses appearing in the output of each high-speed buffer to digital signals for further processing in said radar receiver.

* * * * *